United States Patent
Sasaki (10) Patent No.: US 11,440,411 B2
(45) Date of Patent: Sep. 13, 2022

(54) STEP MOTOR AND INDICATOR INSTRUMENT FOR VEHICLE

(71) Applicant: DENSO CORPORATION, Kariya (JP)

(72) Inventor: Tatsuya Sasaki, Kariya (JP)

(73) Assignee: DENSO CORPORATION, Kariya (JP)

(*) Notice: Subject to any disclaimer, the term of this patent is extended or adjusted under 35 U.S.C. 154(b) by 649 days.

(21) Appl. No.: 16/524,828

(22) Filed: Jul. 29, 2019

(65) Prior Publication Data

US 2019/0381886 A1 Dec. 19, 2019

Related U.S. Application Data

(63) Continuation of application No. PCT/JP2018/008210, filed on Mar. 5, 2018.

(30) Foreign Application Priority Data

Apr. 13, 2017 (JP) .............................. JP2017-079883

(51) Int. Cl.
| | | |
|---|---|---|
| *B60K 37/02* | (2006.01) | |
| *G01D 13/22* | (2006.01) | |
| *H02K 7/116* | (2006.01) | |

(52) U.S. Cl.
CPC ............. *B60K 37/02* (2013.01); *G01D 13/22* (2013.01); *H02K 7/116* (2013.01); *B60K 2370/1515* (2019.05); *B60K 2370/698* (2019.05)

(58) Field of Classification Search
CPC ............ B60K 37/02; B60K 2370/1515; B60K 2370/698; B60K 35/00; G01D 13/22; H02K 7/116; H02K 5/10; H02K 5/1675; H02K 37/14; H02K 37/24; H02K 5/167
See application file for complete search history.

(56) References Cited

U.S. PATENT DOCUMENTS

| | | | |
|---|---|---|---|
| 9,431,874 B2* | 8/2016 | Fukuda | G01D 11/10 |
| 9,614,426 B2* | 4/2017 | Heinrich | H02K 7/116 |
| 11,274,730 B2* | 3/2022 | Sasaki | G01D 13/22 |

(Continued)

FOREIGN PATENT DOCUMENTS

| | | |
|---|---|---|
| JP | 2007151355 A | 6/2007 |
| JP | 2010190748 A | 9/2010 |

(Continued)

*Primary Examiner* — Nimeshkumar D Patel
*Assistant Examiner* — Tania Courson
(74) *Attorney, Agent, or Firm* — Harness, Dickey & Pierce, P.L.C.

(57) ABSTRACT

A step motor that drives a rotary body to rotate includes: an output shaft that outputs a rotational driving force to the rotary body, the output shaft having an insertion hole in which the rotary body is arranged so as to be integrally rotatable on an inner circumference side of a top portion of a tip end of the output shaft; a radial bearing radially supporting the output shaft from an outer circumference side; and a cover protruding from the radial bearing radially inward. The cover opposing the top portion through an axial gap at an outer circumference side of the insertion hole. The output shaft has an inner tapered portion which decreases in diameter as approaching the insertion hole radially inward from the top portion. The cover opposes the top portion through the axial gap at an outer circumference side of the inner tapered portion.

7 Claims, 11 Drawing Sheets

(56) References Cited

U.S. PATENT DOCUMENTS

| | | | | |
|---|---|---|---|---|
| 2009/0173271 A1* | 7/2009 | Sigg | ................. | G01D 13/265 |
| | | | | 116/288 |
| 2011/0114009 A1* | 5/2011 | Fukuda | ............... | G01D 13/265 |
| | | | | 116/288 |
| 2013/0160582 A1 | 6/2013 | Watanabe | | |
| 2014/0033965 A1* | 2/2014 | Ookura | ................. | G01D 7/00 |
| | | | | 116/288 |
| 2018/0138777 A1 | 5/2018 | Yokoyama | | |
| 2019/0337387 A1* | 11/2019 | Sasaki | ................. | G01D 13/22 |
| 2020/0180437 A1* | 6/2020 | Sasaki | ................. | G01D 13/22 |

FOREIGN PATENT DOCUMENTS

| | | | |
|---|---|---|---|
| JP | 2010214573 A | 9/2010 | |
| JP | 2011099826 A | 5/2011 | |
| JP | 2014075890 A | 4/2014 | |
| JP | 2016086556 A | 5/2016 | |
| JP | 2017022891 A | 1/2017 | |
| WO | WO-2012035926 A1 | 3/2012 | |
| WO | WO-2018190028 A1 * | 10/2018 | ............ B60K 35/00 |

\* cited by examiner

STEP MOTOR AND INDICATOR INSTRUMENT FOR VEHICLE

CROSS REFERENCE TO RELATED APPLICATIONS

The present application is a continuation application of International Patent Application No. PCT/JP2018/008210 filed on Mar. 5, 2018, which designated the United States and claims the benefit of priority from Japanese Patent Application No. 2017-079883 filed on Apr. 13, 2017. The entire disclosures of all of the above applications are incorporated herein by reference.

TECHNICAL FIELD

The present disclosure relates to a step motor and an indicator instrument for a vehicle.

BACKGROUND ART

Conventionally, a step motor has been widely used to drive a rotary body to rotate. For example, the rotary body is a rotating indicator indicating a vehicle state value, and is driven to rotate by a step motor.

SUMMARY

According to an aspect of the present disclosure, a step motor that drives a rotary body to rotate includes:
an output shaft that outputs a rotational driving force to the rotary body, the output shaft having an insertion hole in which the rotary body is arranged so as to be integrally rotatable on an inner circumference side of a top portion of a tip end of the output shaft;
a radial bearing radially supporting the output shaft from an outer circumference side; and
a cover protruding from the radial bearing radially inward, and opposing the top portion through an axial gap at an outer circumference side of the insertion hole.

DETAILED DESCRIPTION

An output shaft of a step motor is radially supported by a radial bearing of a case from the radially outer side, and a rotary shaft of a rotary pointer is inserted into an output gear corresponding to the output shaft to be integrally rotatable.

In this case, an edge portion of a support interface between the radial bearing and the output gear is directly exposed to the outside. Therefore, a foreign matter easily enters the support interface through the exposed edge portion from the outside. While the smooth rotation is originally achieved by the radial bearing, the foreign matter may obstruct a smooth rotation of the output gear and the rotary pointer, resulting in a malfunction. In an indicator instrument for a vehicle, if a foreign matter such as dust floating in the vehicle enters the support interface, the rotation of the rotary pointer is inhibited. In this case, the vehicle state value may be improperly indicated, so it is necessary to improve.

The present disclosure provides a step motor in which malfunction is suppressed, and an indicator instrument for a vehicle in which poor instruction of the vehicle state value is suppressed.

According to an aspect of the present disclosure, a step motor that drives a rotary body to rotate includes:
an output shaft that outputs a rotational driving force to the rotary body, the output shaft having an insertion hole in which the rotary body is arranged so as to be integrally rotatable on an inner circumference side of a top portion of a tip end of the output shaft;
a radial bearing radially supporting the output shaft from an outer circumference side; and
a cover protruding from the radial bearing radially inward, and opposing the top portion through an axial gap at an outer circumference side of the insertion hole.

Accordingly, the cover protruding radially inward from the radial bearing faces the top portion with the axial gap, on the outer circumference side of the insertion hole in which the rotary body is inserted to be integrally rotatable at the inner circumference side of the top portion of the tip end, in the output shaft radially supported by the radial bearing from the outer circumference side. As a result, an edge portion of a support interface between the output shaft and the radial bearing can be covered by the cover in the axial direction, at the outer circumference side of the axial gap between the cover and the top portion. Therefore, it is possible to define a labyrinth structure between the outside and the edge portion of the support interface by making the cover and the top portion as close as possible to each other to reduce the axial gap. As a result, it is difficult for a foreign matter to enter the support interface from the outside, such that it is possible to suppress malfunction caused by the foreign matter obstructing the rotation of the output shaft and the rotary body.

An indicator instrument for a vehicle according to the present disclosure includes the above-described step motor and a rotary indicator indicating a state value of the vehicle as a rotary body.

Accordingly, the above-described labyrinth structure can be constructed. Therefore, it is difficult for a foreign matter such as dust to enter the support interface of the output shaft by the radial bearing from inside of the vehicle. Thus, it is possible to suppress an indication failure of the vehicle state value caused by such foreign object obstructing the rotation of the rotary indicator.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
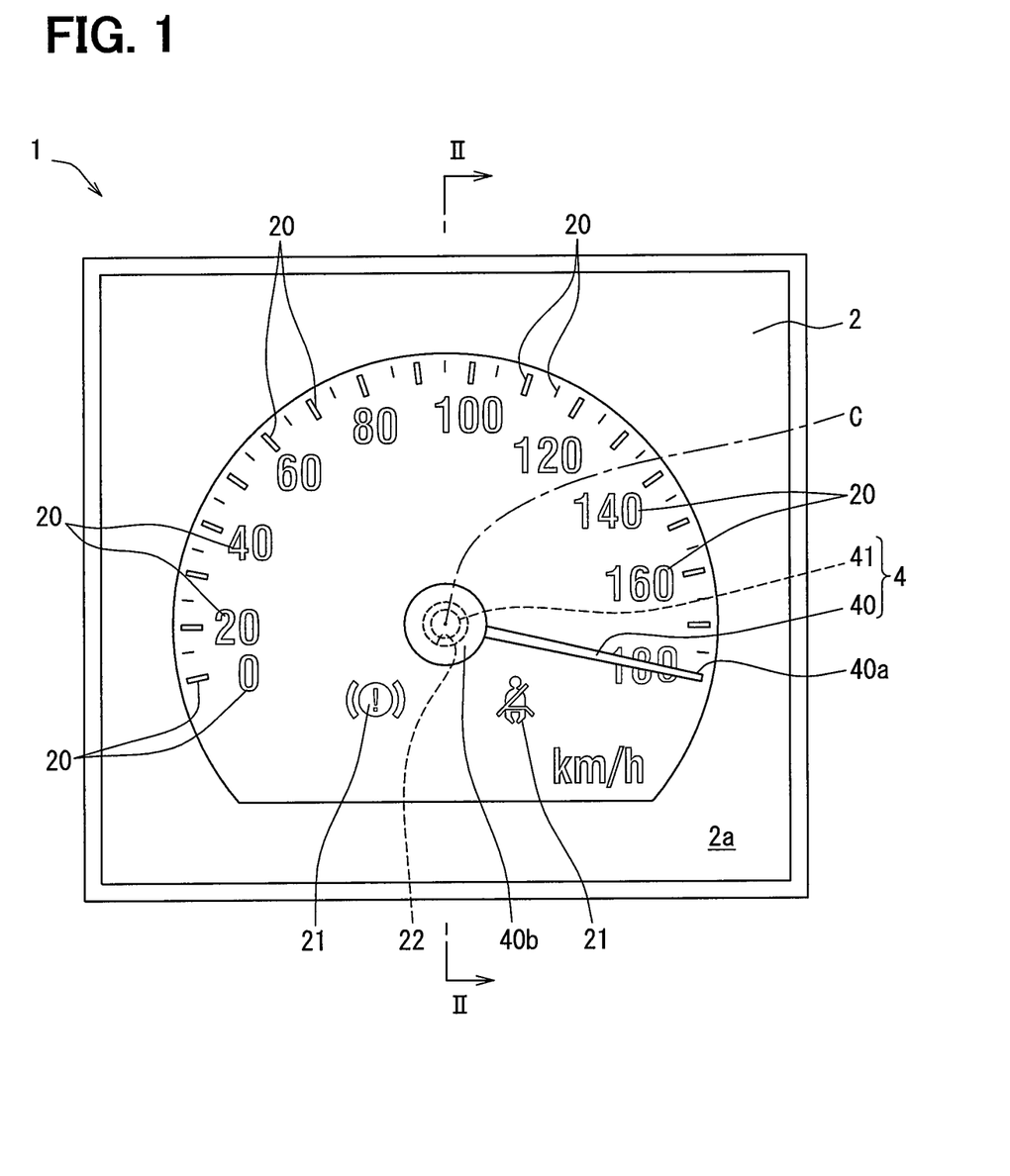
FIG. 1 is a front view showing an indicator instrument for a vehicle according to a first embodiment.
Figure 2:
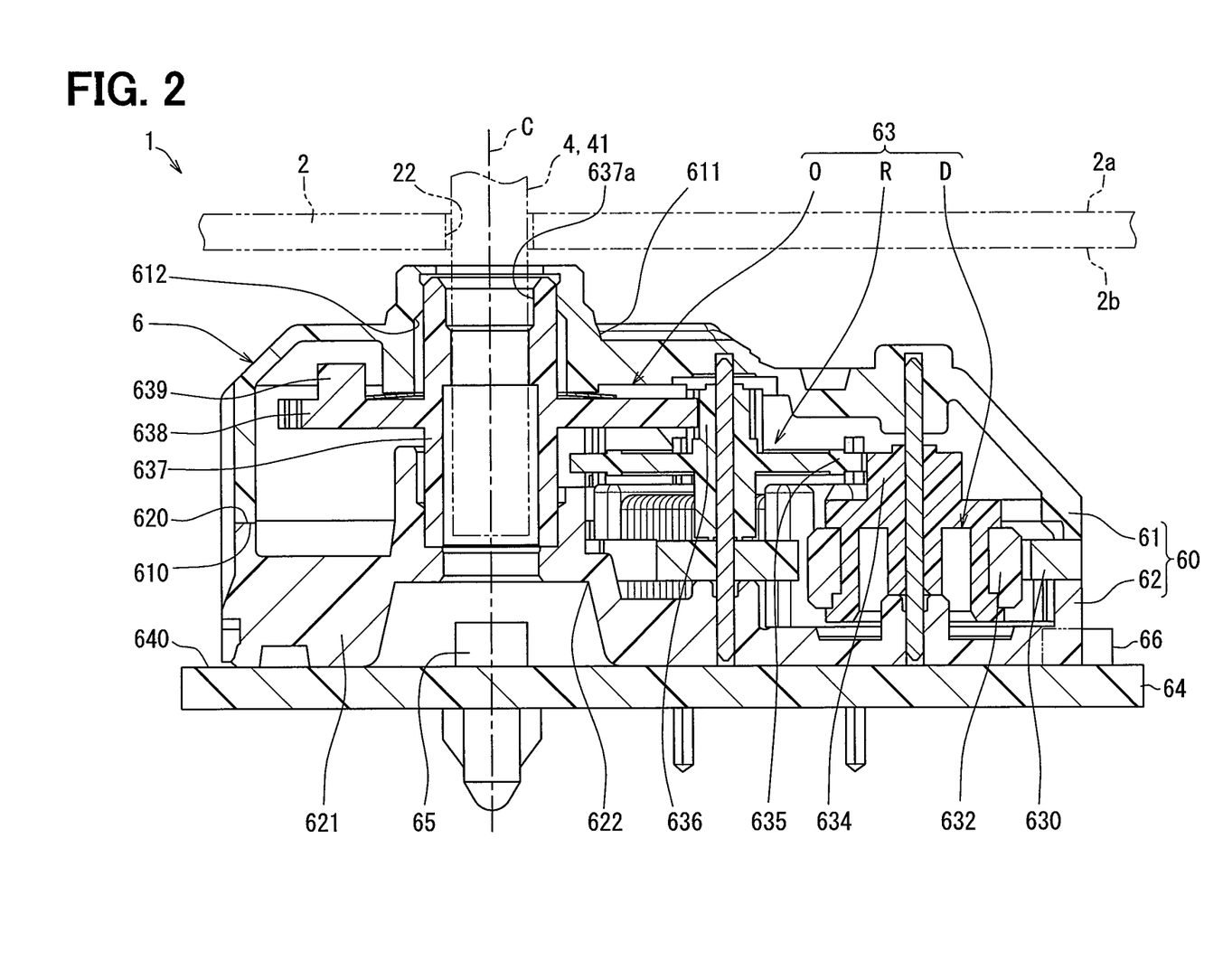
FIG. 2 is a cross-sectional view taken along a line II-II of FIG. 1, showing the indicator instrument including a step motor according to the first embodiment.

As shown in FIGS. 1 and 2, an indicator instrument 1 for a vehicle according to a first embodiment is installed on an instrument panel in the vehicle. The indicator instrument 1 includes a display member 2, a rotary indicator 4, and a step motor 6. In the following description, a "viewing side" means a side on which a display of the instrument 1 is visually recognized by an occupant on a driver's seat in the vehicle, and an "opposite side" means a side opposite to the "viewing side".

The display member 2 is formed by laminating a light shielding printing layer on a light transmissive base material such as a polycarbonate resin or the like, and has a flat plate-like shape as a whole. A display surface 2a, which is one surface of the display member 2, is located on the viewing side. As shown in FIG. 1, an index 20 such as numbers and scales arranged in a rotation direction of the rotary indicator 4 displays a "vehicle state value" in an open portion of the light shielding printing layer in the display member 2. The "vehicle state value" in the present embodiment is a vehicle speed value as shown in FIG. 1, but may be a physical quantity such as an engine speed involved in the vehicle, for example. Further, a warning lamp 21 for warning is formed around a rotation shaft 41 of the rotary indicator 4 in an open portion of the light shielding printing layer in the display member 2.

The rotary indicator 4 as a "rotary body" is made of a light transmissive resin material such as an acrylic resin, and has an indicator body 40 and a rotation shaft 41. The indicator body 40 has an elongated needle shape as a whole, and is disposed on the viewing side of the display surface 2a of the display member 2. The indicator body 40 has a point 40a that instructs the "vehicle state value" represented by the index 20 according to the rotational position. As shown in FIGS. 1 and 2, the rotation shaft 41 has a columnar shape extending from a base end 40b of the indicator body 40 to the opposite side opposite from the viewing side as a whole. The rotation shaft 41 is inserted into an indicator hole 22 that penetrates the display member 2 between a front surface 2a and a back surface 2b. The rotation shaft 41 is connected to the step motor 6 on the opposite side of the back surface 2b of the display member 2. As a result, the step motor 6 realizes the indication described above by the indicator body 40 by rotationally driving the rotary indicator 4 around the rotation center line C which is the axis line of the rotation shaft 41.

As shown in FIG. 2, the step motor 6 is disposed on the opposite side of the back surface 2b of the display member 2. The step motor 6 includes a motor casing 60, a motor body 63, a motor board 64, and light sources 65 and 66.

Figure 3:
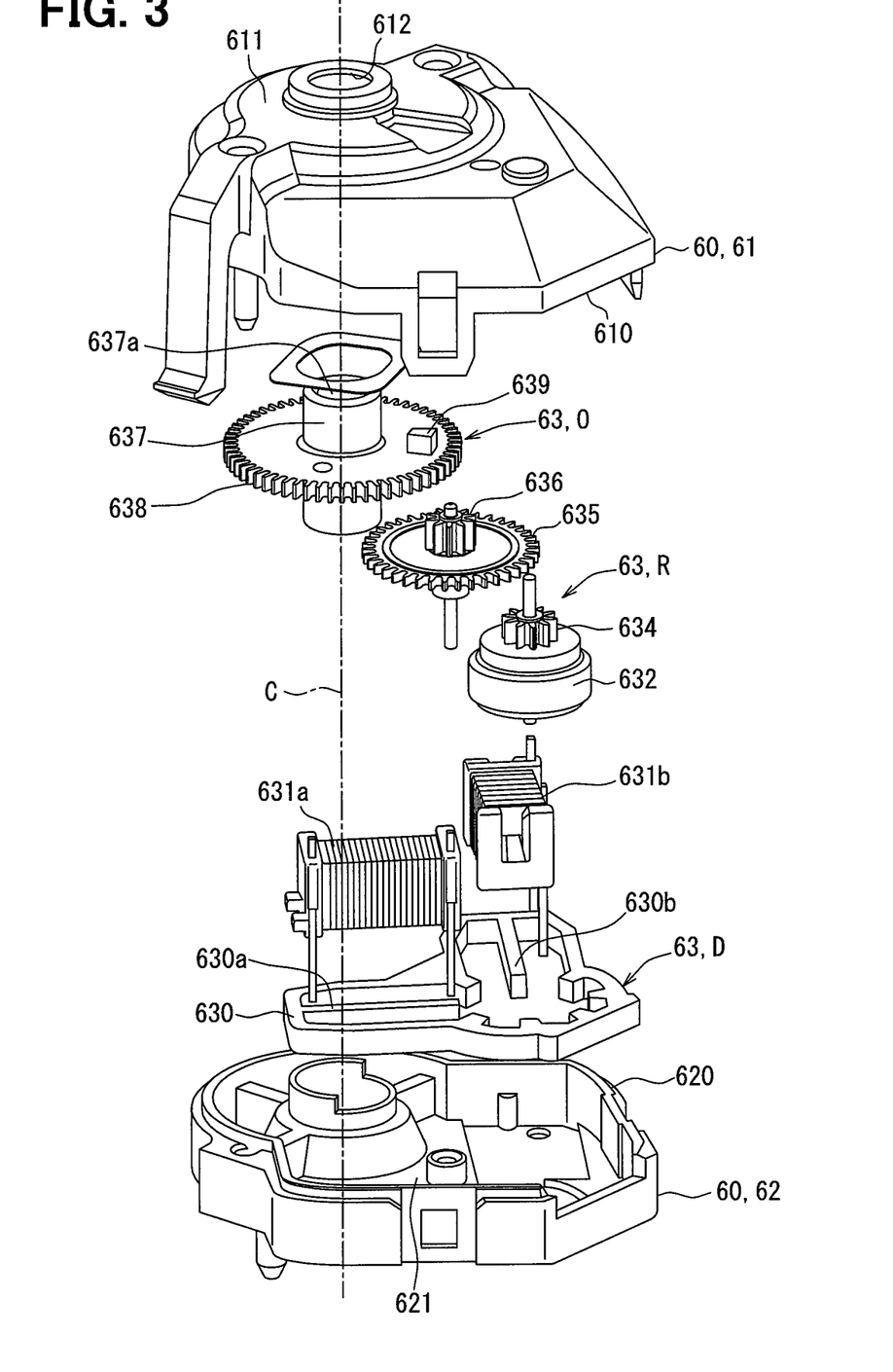
FIG. 3 is an exploded perspective view showing the step motor according to the first embodiment.

As shown in FIGS. 2 and 3, the motor casing 60 is formed by combining case members 61 and 62, and has a hollow shape as a whole. The case members 61 and 62 are each made of a light shielding resin material such as modified polyphenylene ether resin (m-PPE), and are each formed in a cup-like shape. The case members 61 and 62 are coupled to each other by snap-fitting in a state in which respective opening edges 610 and 620 overlap with each other. The case member 61 has a through hole 612 that penetrates through a bottom portion 611 on the rotation center line C of the indicator body 40, and the case member 62 has a through hole 622 that penetrates through a bottom portion 621 on the rotation center line C of the indicator body 40. The first case member 61 is disposed to face the back surface 2b on the opposite side of the display member 2. The second case member 62 is disposed on the opposite side of the first case member 61.

As shown in FIG. 2, the motor board 64 is formed by laminating a metal wiring layer on a printed circuit board such as a glass epoxy substrate or the like, and has a flat plate-like shape as a whole. The motor board 64 is disposed on the opposite side of the motor casing 60. A mounting surface 640, which is one surface of the motor board 64, has a planar shape. The motor casing 60 and the light sources 65 and 66 are held on the mounting surface 640.

As shown in FIGS. 2 to 5, the motor body 63 is housed in the motor casing 60. As a result, the motor body 63 is mounted on the mounting surface 640 of the motor board 64 through the motor casing 60. The motor body 63 includes a driving source D, a speed reduction mechanism R, and a rotation output mechanism O.

Figure 4:
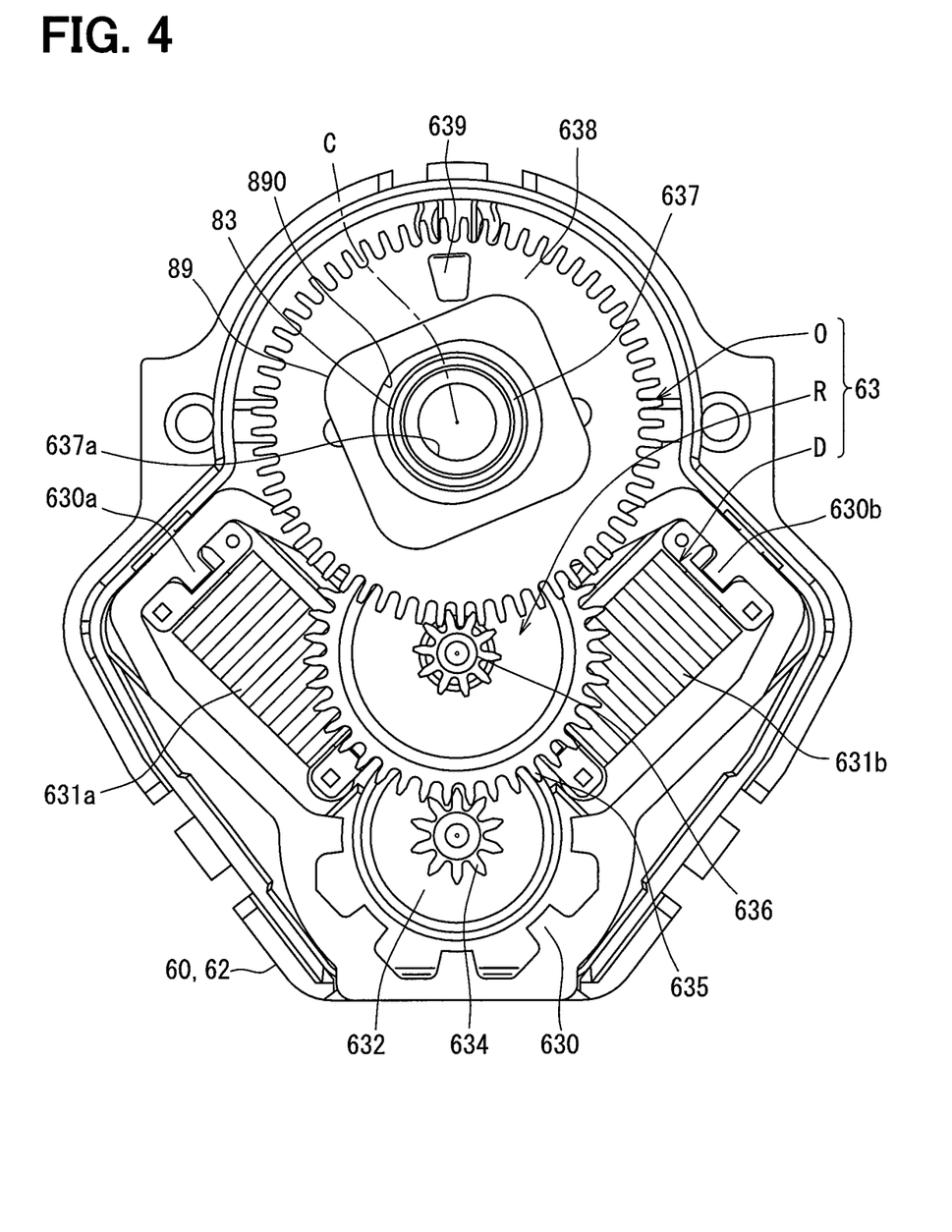
FIG. 4 is a plan view showing an inside of the step motor according to the first embodiment.
Figure 5:
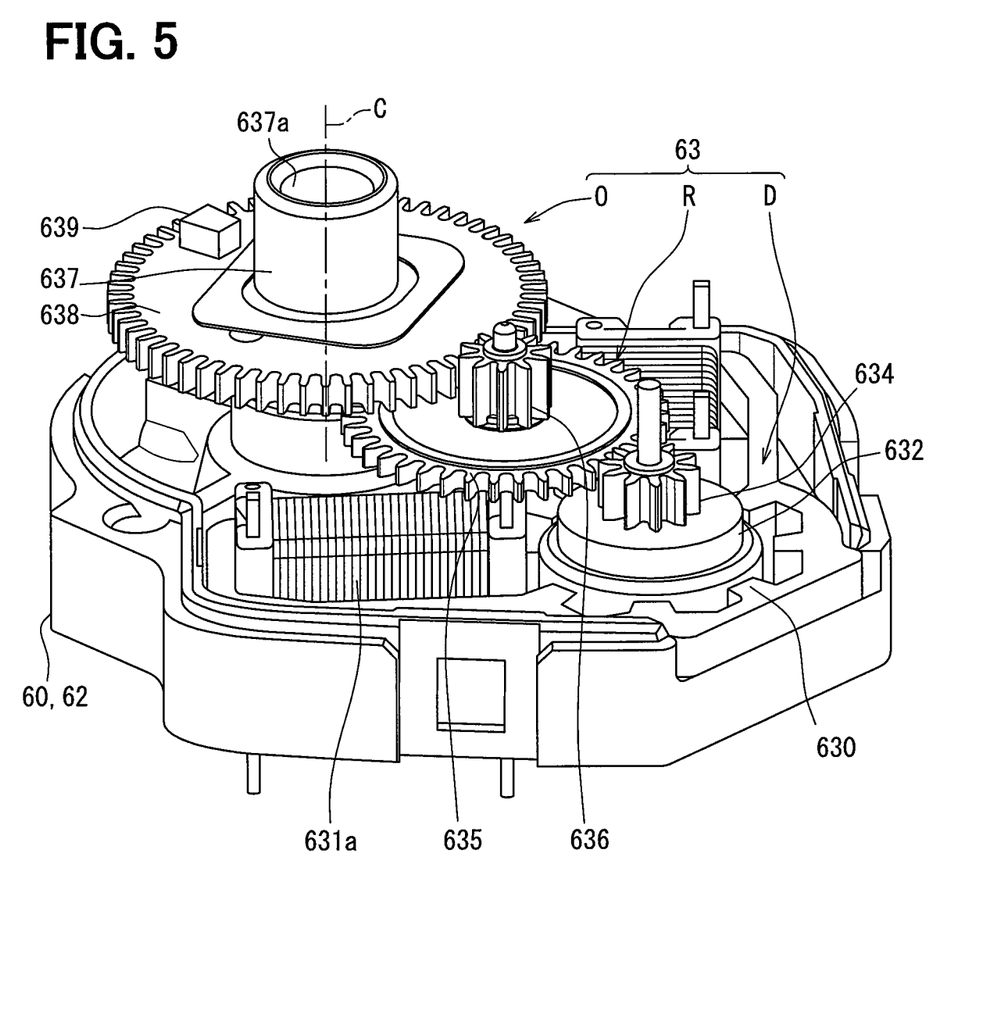
FIG. 5 is a perspective view showing the inside of the step motor according to the first embodiment.

The driving source D is formed by combining a yoke 630, two-phase coils 631a and 631b, and a magnet rotor 632 together, and is deviated from the rotation center line C of the indicator body 40 in a radial direction. The yoke 630 is formed in a frame shape and made of a magnetic metal material such as iron and is fixed to the motor casing 60. The yoke 630 has magnetic poles 630a and 630b protruding toward an inner circumference side. The coil 631a of the A-phase is wound around one magnetic pole 630a, and the coil 631b of the B-phase is wound around the other magnetic pole 630b. The coil 631a of the A-phase and the coil 631b of the B-phase are electrically connected to a metal wiring layer of the motor board 64 through a through hole that penetrates through the second case member 62 of the motor casing 60.

The magnet rotor 632 is formed in a disc shape and made of a magnetic metal material such as ferrite. The magnet rotor 632 is spaced from each of the magnetic poles 630a and 630b and disposed on the inner circumference side of the yoke 630. The magnet rotor 632 is radially supported and thrust-supported by the motor casing 60 so as to be rotatable about an axis line substantially parallel to the rotation center line C of the indicator body 40. N and S poles as magnetic poles are alternately magnetized in the rotation direction at an outer circumference portion of the magnet rotor 632.

In the driving source D configured as described above, AC signals having phases shifted by 90 degrees from each other are applied to the coils 631a and 631b of the phases A and B from an external control circuit through a metal wiring layer of the motor board 64. As a result, the alternating magnetic flux generated in each of the coils 631a and 631b passes between the yoke 630 and the magnet rotor 632, thereby driving the rotor 632 to a predetermined rotational position.

The speed reduction mechanism R is formed by combining a magnet gear 634, an idle gear 635, and a pinion gear 636 together, and is disposed radially away from the rotation center line C of the indicator body 40. The magnet gear 634 is made of a hard resin material such as polyacetal resin (POM), and has a spur gear shape. The magnet gear 634 is radially supported and thrust-supported by the motor casing 60 so as to be integrally rotatable with the magnet rotor 632.

The idle gear 635 and the pinion gear 636 are formed integrally coaxially with each other and made of a hard resin material such as polybutylene terephthalate resin (PBT), and each has a spur gear shape. The idle gear 635 and the pinion gear 636 are radially supported and thrust-supported by the motor casing 60 so as to be integrally rotatable about an axis line substantially parallel to the rotation center line C of the indicator body 40. The idle gear 635 meshes with the magnet gear 634 to decelerate the rotation of the gear 634.

The rotation output mechanism O is formed by combining an output shaft 637, an output gear 638, and a rotation stopper 639, and is disposed on the rotation center line C of the indicator body 40. The output shaft 637, the output gear 638, and the rotation stopper 639 are integrally made of a hard resin material such as polyacetal resin (POM). The output shaft 637, the output gear 638, and the rotation stopper 639 are radially supported and thrust-supported by the motor casing 60 so as to be integrally rotatable about the rotation center line C of the indicator body 40.

The output shaft 637 has a cylindrical shape as a whole. The rotation shaft 41 of the rotary indicator 4 is coaxially press-fitted into a center hole 637a of the output shaft 637. As a result, the output shaft 637 rotates around the rotation center line C together with the rotary indicator 4, thereby outputting a rotational driving force to the rotary indicator 4. The output gear 638 has a spur gear shape extending from the output shaft 637 to the outer circumference side. The output gear 638 meshes with the pinion gear 636 of the speed reduction mechanism R to reduce the rotation of the gear 636. With the above configuration, in the motor body 63, the rotational driving force increased by a deceleration action of the speed reduction mechanism R from the driving source D is given from the rotation output mechanism O to the rotary indicator 4.

The rotation stopper 639 has a protruding piece shape protruding from the output gear 638 toward the viewing side. The rotation stopper 639 is provided so as to be lockable by fixed stoppers of the motor casing 60 at limit positions on both sides of the rotary indicator 4 which determine a rotation range of the rotary indicator 4. As a result, even if the rotational driving force is applied from the rotation output mechanism O to the rotary indicator 4, the rotation of the rotary indicator 4 is limited within the rotation range.

As shown in FIG. 2, the light source 65 for illuminating the rotary body is disposed on the rotation center line C of the indicator body 40 in the through hole 622 of the second case member 62, and is mounted on the mounting surface 640 of the motor board 64. The light source 65 includes an LED (Light Emitting Diode) and is electrically connected to a metallic wiring layer of the motor board 64. The light source 65 emits a light by being energized by an external control circuit through the metal wiring layer. The light emitted from the light source 65 passes through the through hole 622 of the second case member 62 and the center hole 637a of the output shaft 637, and is incident on the rotation shaft 41 of the rotary indicator 4, thereby being guided to the indicator body 40 of the rotary indicator 4. As a result, the rotary indicator 4 is illuminated through the motor body 63, so that the indicator body 40 is visually recognized in a light emitting state.

The light sources 66 for illuminating the display are disposed around the second case member 62 and mounted on the mounting surface 640 of the motor board 64. Each of the light sources 66 includes an LED, and is electrically connected to the metal wiring layer of the motor board 64. Each of the light sources 66 emits light by being energized by an external control circuit through the metal wiring layer at the time of necessary warning. The light emitted from the light source 66 passes around the motor casing 60 and is incident on the display member 2. As a result, the display member 2 is directly illuminated, so that the warning lamp 21 is visually recognized in a light emitting state at the time of necessary warning.

(Foreign Material Intrusion Suppression Structure)

Figure 6:
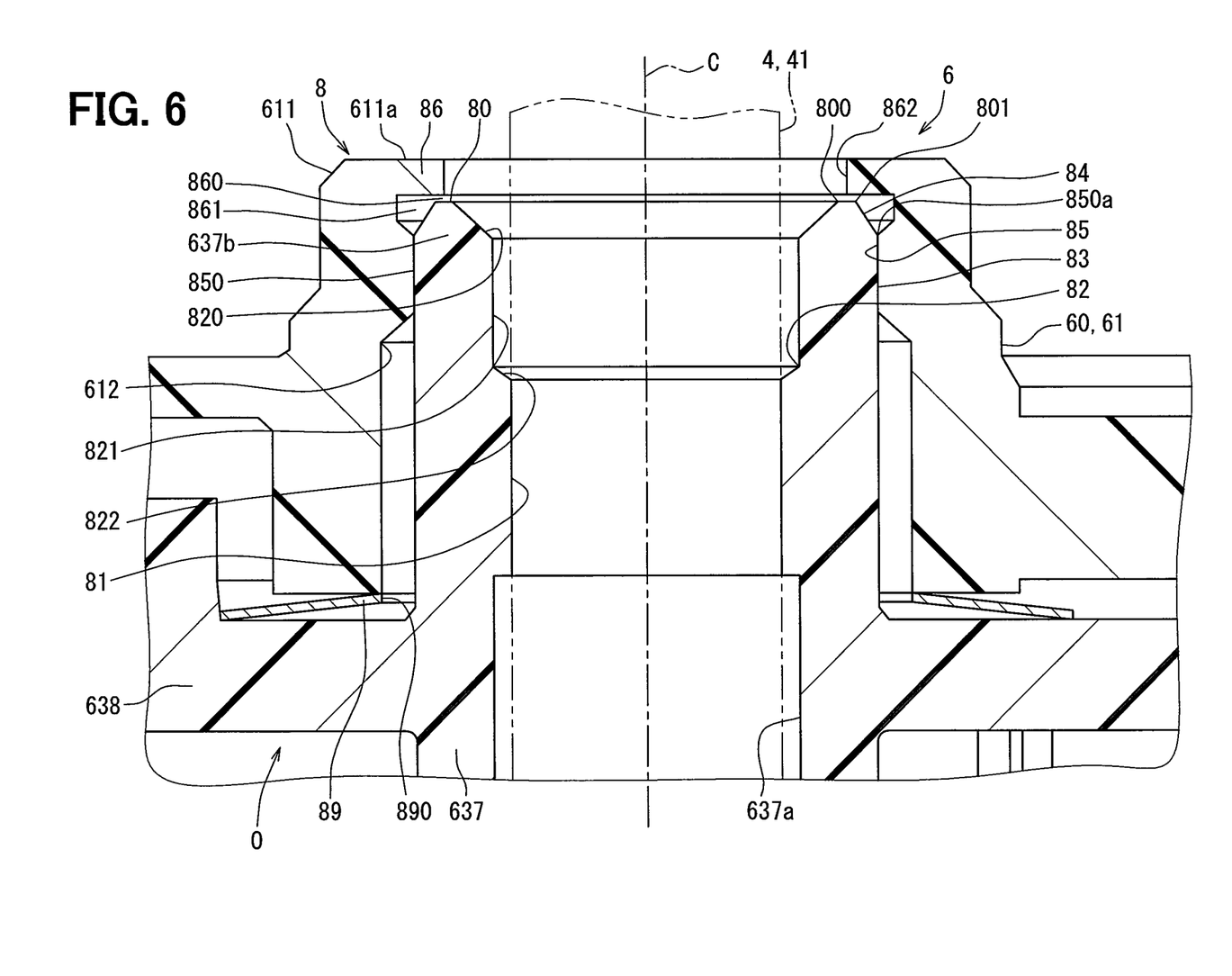
FIG. 6 is an enlarged cross-sectional view of FIG. 2.
Figure 7:
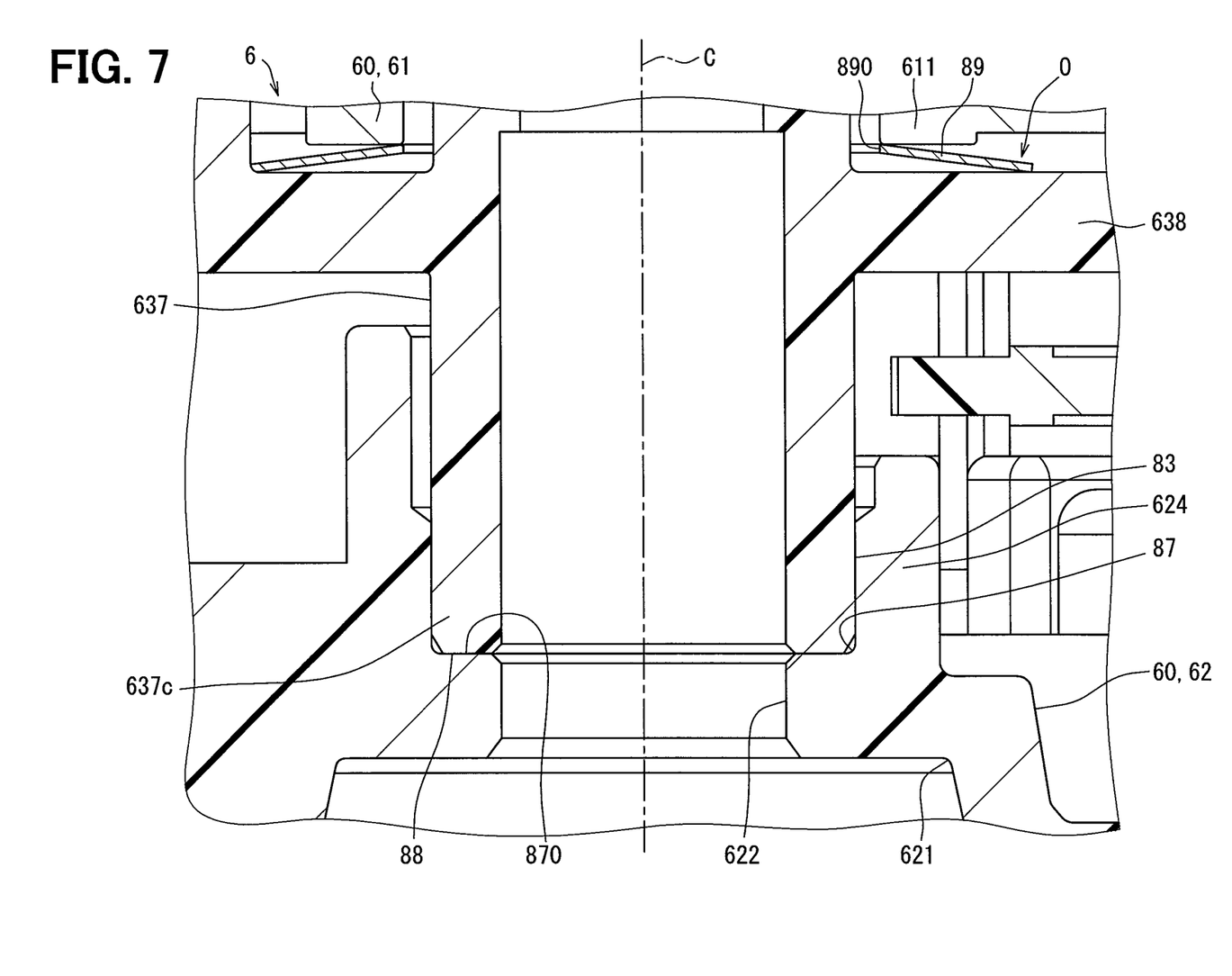
FIG. 7 is an enlarged cross-sectional view of FIG. 2.

A structure 8 for suppressing intrusion of foreign matters and its related structure of the first embodiment will be described in detail with reference to FIGS. 6 and 7. In the following description, the axial direction along the rotation center line C shown in FIGS. 6 and 7 is simply referred to as axial direction. The radial direction substantially perpendicular to the rotation center line C is simply referred to as radial direction. The circumferential direction around the rotation center line C is simply referred to as circumferential direction.

As shown in FIG. 6, a tip end 637b of the output shaft 637 is inserted into the through hole 612 of the first case member 61 of the motor casing 60. A top portion 80 is defined by an end face of the tip end 637b of the output shaft 637. The top portion 80 of the present embodiment has a circular annular planar shape continuous in the circumferential direction, and has a width in the radial direction.

The output shaft 637 has a center hole 637a open at the top portion 80 of the tip end 637b. The output shaft 637 has an insertion hole 81 and a guide hole 82, each of which is formed by a part of the center hole 637a in the axial direction.

The insertion hole 81 is provided in a predetermined range of the output shaft 637 in the axial direction that is spaced away from the top portion 80 on the opposite side opposite from the viewing side. The insertion hole 81 has a cylindrical hole shape extending straight along the axial direction. The inner diameter of the insertion hole 81 is set smaller than the inner diameter of the inner circumference edge 800 of the top portion 80. A part of the rotation shaft 41 of the rotary indicator 4 in the axial direction is coaxially inserted in a part of the insertion hole 81 in the axial direction. Before the insertion, the rotation shaft 41 has a larger diameter than the insertion hole 81. The rotation shaft 41 is inserted in the insertion hole 81, with a press-fitting margin. That is, the rotation shaft 41 is press-fitted and fixed to the insertion hole 81. Thus, the rotary indicator 4 is rotatable integrally with the output shaft 637.

The guide hole 82 is provided in a predetermined range of the output shaft 637 with a stepped inner circumference surface from the top portion 80 to the insertion hole 81 in the axial direction. The guide hole 82 has a first inner tapered portion 820, a second inner tapered portion 822, and an inner straight portion 821. Here, the first inner tapered portion 820 has a tapered hole shape (that is, a conical hole shape) that gradually decreases in diameter as approaching the insertion hole 81 radially inward from the inner circumference edge 800 of the top portion 80 in the axial direction. The inner straight portion 821 is formed of a cylindrical hole extending straight in the axial direction from the end of the first inner tapered portion 820 on the opposite side (that is, the inner circumference edge). The second inner tapered portion 822 has a tapered hole shape (that is, a conical hole shape) that gradually decreases in diameter as approaching the insertion hole 81 radially inward from the end of the inner straight portion 821 opposite to the viewing side in the axial direction.

The output shaft 637 further has an outer straight portion 83 and an outer tapered portion 84, each of which is formed by an axial part of the outer circumference side of the top portion 80 on the radially outer side of the tip end 637b.

The outer straight portion 83 is provided in a predetermined axial range of the output shaft 637 that is separated from the top portion 80 toward the opposite side opposite to the viewing side. The outer straight portion 83 has a cylindrical surface shape extending straight along the axial direction. The outer diameter of the outer straight portion 83 is set larger than the outer diameter of the outer circumference edge 801 of the top portion 80. The outer tapered portion 84 is provided in a predetermined axial range of the output shaft 637 from the top portion 80 to the outer straight portion 83. The outer tapered portion 84 has a tapered surface shape (that is, a conical surface shape) gradually increasing in diameter as approaching the support interface 850 of the radial bearing 85 radially outward from the outer circumference edge 801 of the top portion 80 in the axial direction.

The first case member 61 of the motor casing 60 has the through hole 612 coaxially surrounding the output shaft 637. The first case member 61 has the radial bearing 85 and the cover 86, each of which is formed by an axial side of the through hole 612.

The radial bearing 85 is provided in a predetermined axial range of the first case member 61 that is separated from the outer surface 611a of the bottom portion 611 toward the opposite side opposite from the viewing side. The radial bearing 85 is defined by an inner circumference surface of a cylindrical hole extending straight along the axial direction. The inner diameter of the radial bearing 85 is set to be smaller than the inner diameter of a portion of the through hole 612 located on both sides of the radial bearing 85 in the axial direction. A part of the outer straight portion 83 on the viewing side of the output gear 638 in the axial direction is coaxially inserted into the entirety of the radial bearing 85 in the axial direction. In the present embodiment, the outer straight portion 83 formed slightly smaller in diameter than the radial bearing 85 is fitted on the inner circumference side of the radial bearing 85 so as to be relatively slidable. As a result, the radial bearing 85 radially supports the output shaft 637 from the outer circumference side, thereby forming the support interface 850 between the radial bearing 85 and the output shaft 637.

The cover 86 is provided in a predetermined axial range of the first case member 61 from the outer surface 611a of the bottom portion 611 to the radial bearing 85. The cover 86 protrudes radially inward from the radial bearing 85 and has a circular ring disk shape continuous in the circumferential direction. The cover 86 of the present embodiment is integrally formed with the radial bearing 85. Further, the cover 86 of the present embodiment has the inner circumference edge 862 on the protruding side, and the inner circumference edge 862 is located within a radial range at the outer circumference side of the insertion hole 81 of the output shaft 637 and the first inner tapered portion 820 of the guide hole 82 and at the inner circumference side of the outer tapered portion 84 of the output shaft 637. That is, the inner circumference edge 862 of the cover 86 is disposed in a radial range at the outer circumference side of the inner circumference edge 800 of the top portion 80 and at the inner circumference side of the outer circumference edge 801 of the top portion 80. The cover 86 faces the top portion 80 of the output shaft 637 through the axial gap 860, and the cover 86 faces the outer tapered portion 84 of the output shaft 637 through the axial gap 861, at the outer circumference side of the insertion hole 81 and the first inner tapered portion 820.

In the axial gap 860 formed between the cover 86 and the top portion 80, an axial width and a radial width capable of constructing a labyrinth structure are defined between an edge 850a of the support interface 850 adjacent to the top portion 80, formed by the radial bearing 85 and the output shaft 637, and the outside of the motor casing 60. Therefore, the axial width of the axial gap 860 is set to be smaller than the size of foreign matter expected to intrude into the support interface 850 as a foreign matter such as dust floating in the vehicle. As a result, a labyrinth structure effective for restricting intrusion of foreign matter into the support interface 850 is established between the edge 850a of the support interface 850 and the outside of the motor casing 60.

As shown in FIG. 7, the second case member 62 of the motor casing 60 has the cylindrical portion 624 protruding to the viewing side from the bottom portion 621 in the axial direction. The second case member 62 has a thrust bearing 87 formed by a part of the cylindrical portion 624 in the axial direction.

The thrust bearing 87 is provided in a predetermined axial range in the second case member 62 from the bottom portion 621. The thrust bearing 87 is defined by an inner circumference surface of a bottomed cylindrical hole which is coaxially continued with the through hole 622 of the second case member 62 and extends straight along the axial direction. The inner diameter of the thrust bearing 87 is set larger than the inner diameter of the through hole 622. As a result, the bottom surface 870 of the thrust bearing 87 has an annular planar shape.

An axial part of the outer straight portion 83 of the output shaft 637 on the opposite side of the output gear 638 is coaxially inserted in the entirety of the thrust bearing 87 in the axial direction. In the present embodiment, the outer straight portion 83 formed slightly smaller in diameter than the thrust bearing 87 is fitted on the inner circumference side of the thrust bearing 87 so as to be relatively slidable. Further, in the present embodiment, the bottom surface 870 of the thrust bearing 87 is in surface contact with an end face 88 of the base end 637c of the output shaft 637 having a circular planar shape on the opposite side opposite to the top portion 80 in the axial direction, in slidable manner. As described above, the thrust bearing 87 radially supports the output shaft 637 from the outer circumferential side and thrust-supports the output shaft 637 from the opposite side opposite to the top portion 80 in the axial direction.

As shown in FIGS. 4, 6, and 7, the rotation output mechanism O further includes a biasing member 89 in addition to the output shaft 637, the output gear 638, and the rotation stopper 639.

The biasing member 89 is formed of an elastic metallic material such as stainless steel (SUS) and has a leaf spring shape. The biasing member 89 has a center hole 890 shaped in a cylindrical hole and is disposed coaxially with the outer straight portion 83 of the output shaft 637. The center hole 890 of the biasing member 89 surrounds the outer straight portion 83 from the outer circumference side between the radial bearing 85 and the output gear 638. The biasing member 89 is elastically deformed by being compressed between the bottom portion 611 of the first case member 61 and the output gear 638 to be rotatable integrally with the output gear 638. As a result, the biasing member 89 urges the output shaft 637 toward the opposite side opposite to the top portion 80 in the axial direction regardless of the rotational position of the output gear 638 and the output shaft 637.

Operation and Effects

The operation and effects of the first embodiment will be described below.

According to the first embodiment, the output shaft 637 is radially supported from the outer circumference side by the radial bearing 85. The rotary indicator 4 is inserted into the insertion hole 81 so as to be rotatable integrally on the inner circumference side of the top portion 80 of the tip end 637*b*. The cover 86 projects inwardly from the radial bearing 85 in the radial direction, and faces the top portion 80 with the axial gap 860. As a result, the edge 850*a* of the support interface 850 between the output shaft 637 and the radial bearing 85 can be covered axially by the cover 86 on the outer circumference side of the axial gap 860 between the cover 86 and the top portion 80. Therefore, it is possible to construct a labyrinth structure between the outside and the edge 850*a* of the support interface 850 by making the cover 86 and the top portion 80 as close as possible to each other to reduce the axial gap 860. This makes it difficult for foreign matter to enter the support interface 850 from the outside, so it is possible to suppress malfunctions caused by such foreign matter obstructing the rotation of the output shaft 637 and the rotary indicator 4.

According to the first embodiment, it is difficult for foreign matter such as dust floating in the vehicle to enter the support interface 850 of the output shaft 637 by the radial bearing 85. Therefore, it is also possible to suppress a poor instruction of the vehicle state value caused by such foreign matter obstructing the rotation of the rotary indicator 4.

According to the first embodiment, the rotation shaft 41 of the rotary indicator 4 is pressed against the first inner tapered portion 820 with the diameter decreasing as approaching the insertion hole 81 radially inward from the top portion 80 in the output shaft 637. Thus, the rotation shaft 41 can be guided toward the insertion hole 81. Moreover, since the axial gap 860 between the cover 86 and the top portion 80 opposing with each other is located on the outer circumference side of the first inner tapered portion 820, the guiding of the rotary indicator 4 by the first inner tapered portion 820 is hardly obstructed by the cover 86. Therefore, it is possible to ensure workability of inserting the rotary indicator 4 into the insertion hole 81 at the time of manufacturing, and it is possible to obtain the effect of suppressing malfunction after the manufacturing.

Furthermore, according to the first embodiment, since the top portion 80 of the output shaft 637 having the width in the radial direction faces the cover 86, it is possible to increase the axial gap 860 between the top portion 80 and the cover 86 in the radial direction. Therefore, it is possible to construct a labyrinth structure that is excellent in regulating an invasion of foreign matter. Therefore, it is possible to enhance the effect of suppressing malfunction.

Further, according to the first embodiment, since the outer tapered portion 84 with the diameter enlarged as approaching radially outward the support interface 850 of the radial bearing 85 from the top portion 80 in the output shaft 637 can serve as chamfering, the output shaft 637 is hardly damaged at the time of manufacturing. While the axial gap 861 between the outer tapered portion 84 and the cover 86 on the outer circumference side is larger than the axial gap 860 between the top portion 80 and the cover 86 on the inner circumference side, it is possible to construct a labyrinth structure that is effective for restricting invasion of foreign matter by reducing the axial gap 860. Accordingly, it is possible to suppress breakage at the manufacturing time and to obtain effect of suppressing malfunction after the manufacturing.

In addition, according to the first embodiment, the output shaft 637 is thrust-supported by the thrust bearing 87 from the side opposite to the top portion 80, and is urged toward the opposite side by the biasing member 89 that surrounds the output shaft 637 from the outer circumference side.

Accordingly, the position of the output shaft 637 in the axial direction can be stabilized, and the size of the axial gap 860 between the cover 86 and the top portion 80 can be stabilized. Thus, a labyrinth structure effective for restricting intrusion of foreign matter can be secured regardless of the rotational position of the output shaft 637. Therefore, it is possible to continuously suppress malfunction.

In addition, according to the first embodiment, a manufacturing tolerance hardly occurs in the axial position of the cover 86 integrally formed with the radial bearing 85. Therefore, it is possible to easily guarantee a labyrinth structure effective for restricting intrusion of foreign matter regardless of products. Therefore, it is possible to increase the production yield at the time of manufacturing, and to obtain the effect of suppressing malfunction after the manufacturing.

Second Embodiment

Figure 8:
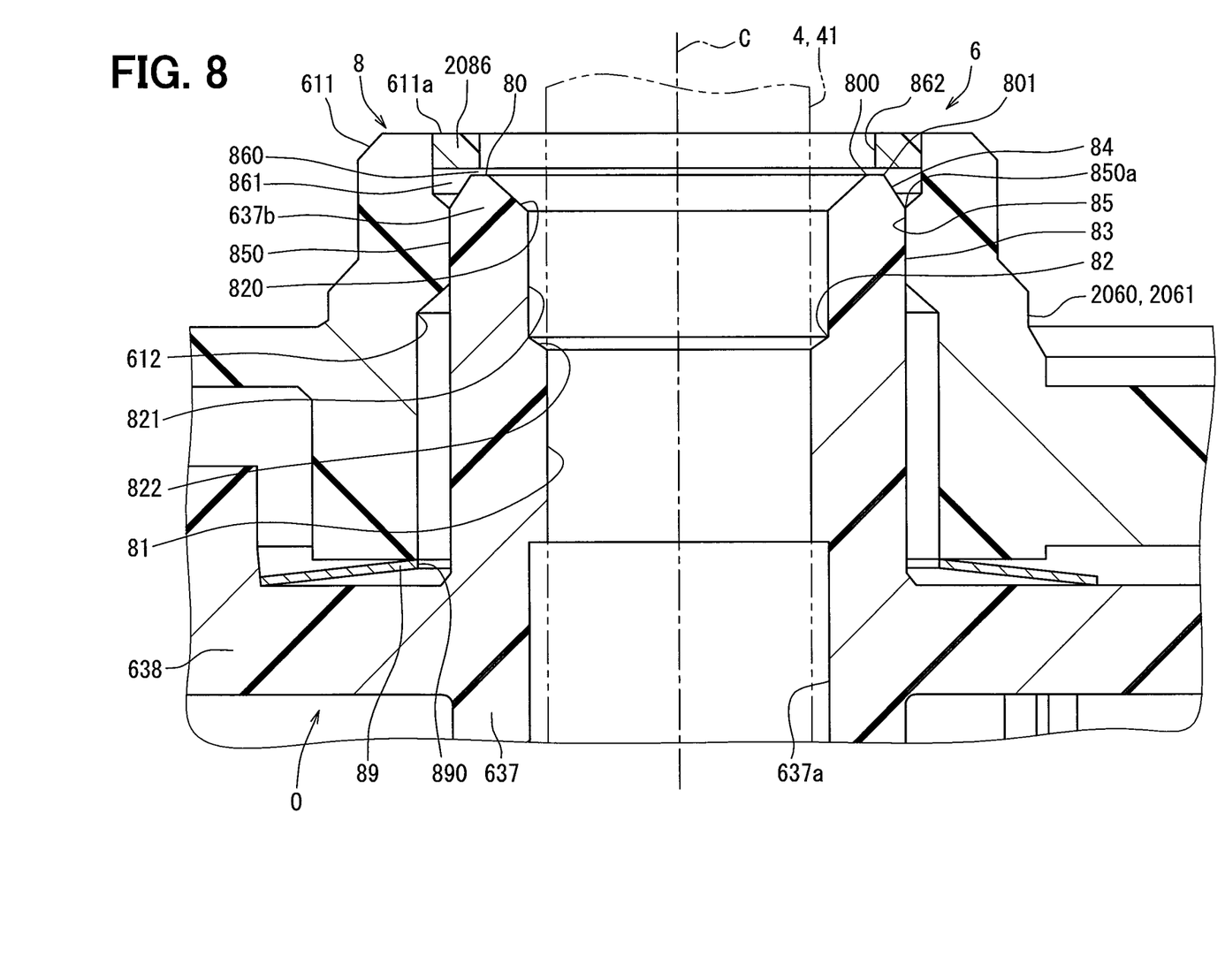
FIG. 8 is an enlarged cross-sectional view showing a part of a step motor according to a second embodiment, corresponding to FIG. 6.

A second embodiment shown in FIG. 8 is a modification of the first embodiment. In the second embodiment, the first case member 2061 of the motor casing 2060 has the cover 2086 made of light-shielding resin material such as a modified polyphenylene ether resin (m-PPE) or the like. The cover 2086 is formed as a separate body from the radial bearing 85, and is mounted on the radial bearing 85.

According to the second embodiment, it is easy to construct a labyrinth structure in which the cover 86 faces the top portion 80 by forming the cover 86 separately from the radial bearing 85 and by attaching the cover 86 to the radial bearing 85. Accordingly, it is possible to obtain the effect of suppressing malfunction and simplifying the production facilities required for the complex shape in which the cover 86 projects radially inward from the radial bearing 85.

Other Embodiments

Although multiple embodiments have been described above, the present disclosure is not construed as being limited to the embodiments, and can be applied to various embodiments and combinations within a scope that does not depart from the gist of the present disclosure. In the following, FIGS. 9 to 11 represent modifications relating to the first embodiment as representative examples.

Figure 9:
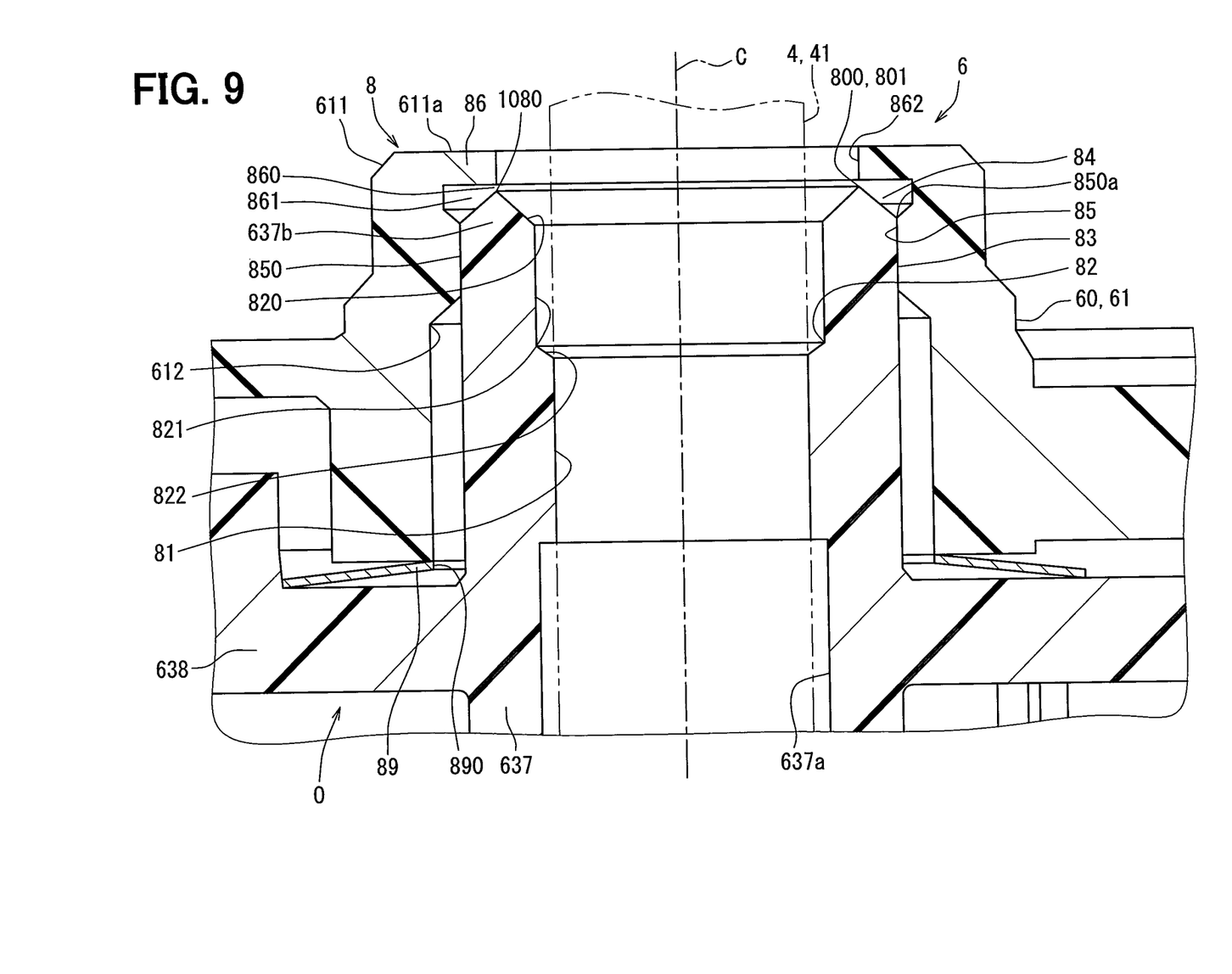
FIG. 9 is a cross-sectional view showing a modification of FIG. 6.

Specifically, in Modification 1, as shown in FIG. 9, a top portion 1080 which is sharp and has substantially no width in the radial direction may be adopted. Also in Modification 1, the cover 86 faces the top portion 1080 through the axial gap 860.

Figure 10:
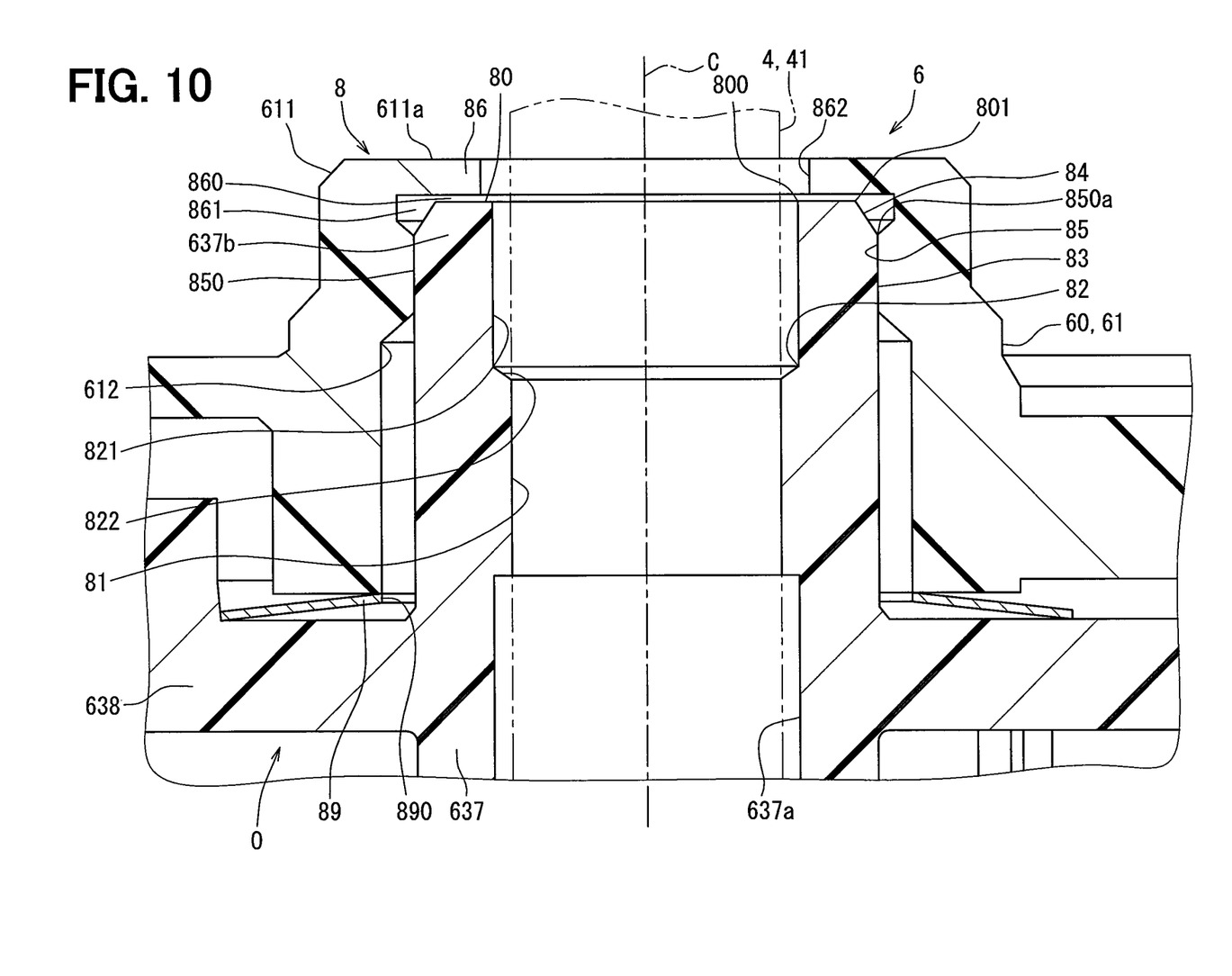
FIG. 10 is a cross-sectional view showing a modification of FIG. 6.

In Modification 2, as shown in FIG. 10, the inner straight portion 821 is extended from the inner circumference edge 800 of the top portion 80 without providing the first inner tapered portion 820. In Modification 2 shown in FIG. 10, the inner circumference edge 862 of the cover 86 protrudes as far as possible toward the inner circumference side, so that the axial gap 860 is largely secured in the radial direction.

Figure 11:
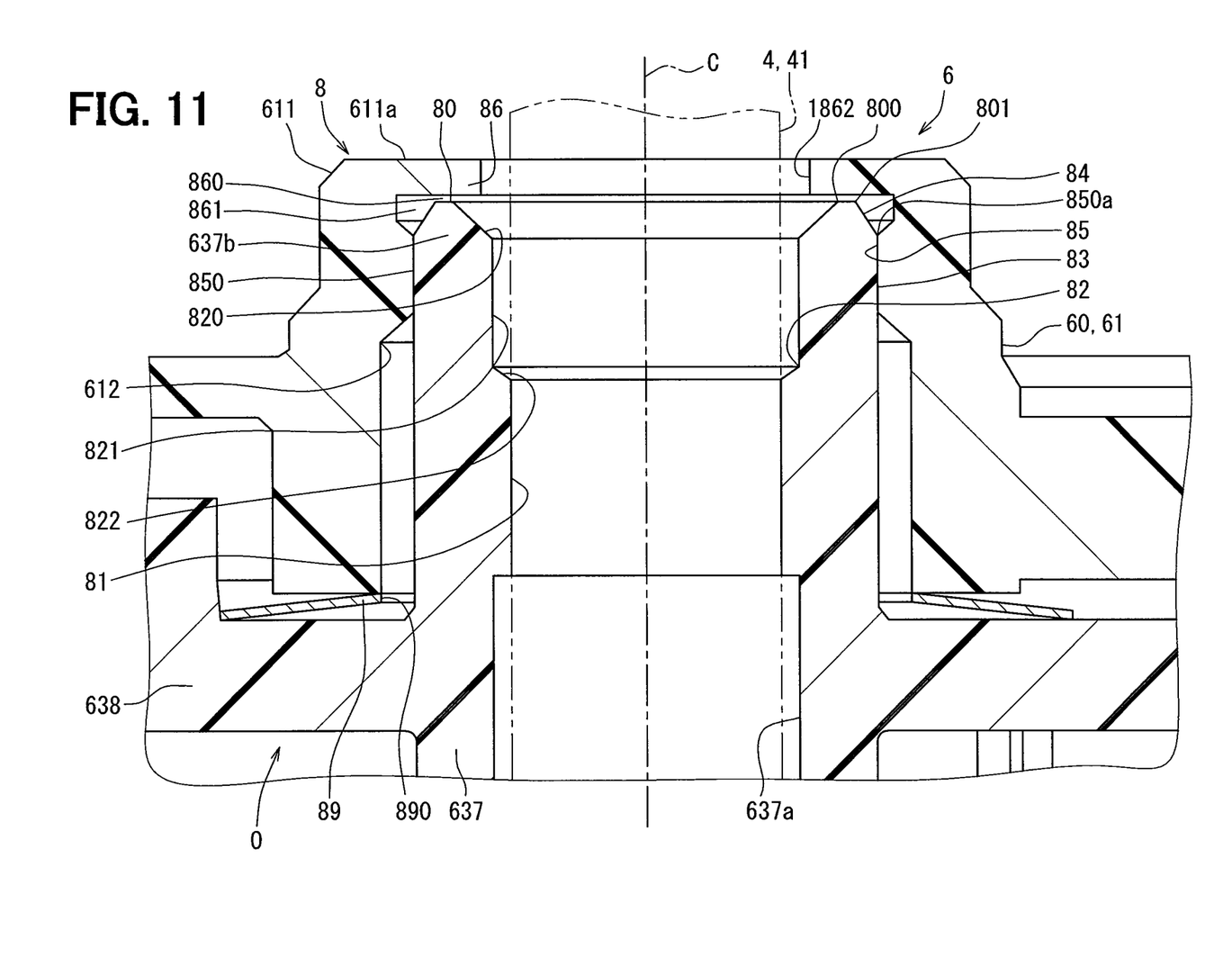
FIG. 11 is a cross-sectional view showing a modification of FIG. 6.

In Modification 3, as shown in FIG. 11, the inner circumference edge 1862 of the cover 86 is positioned in the radial range at the outer circumference side of the insertion hole 81 of the output shaft 637 and at the inner circumference side of the top portion 80 of the output shaft 637. In Modification 3 shown in FIG. 11, the inner circumference edge 1862 of the cover 86 is arranged in the radial range at the outer circumference side of the inner straight portion 821 and the second inner tapered portion 822 of the guide hole 82 and at the inner circumference side of the top portion 80.

In Modification 4, it is not necessary to provide the outer tapered portion 84. In Modification 5, the biasing member 89 may not be provided. In Modification 6, the present disclosure may be applied to a device such as a head-up display (HUD) other than the indicator instrument 1 for a vehicle, and the "rotary body" of the device may be rotationally driven by the step motor 6.

What is claimed is:

1. A step motor that drives a rotary body to rotate, comprising:
    an output shaft that outputs a rotational driving force to the rotary body, the output shaft having an insertion hole in which the rotary body is arranged so as to be integrally rotatable on an inner circumference side of a top portion of a tip end of the output shaft;
    a radial bearing radially supporting the output shaft from an outer circumference side; and
    a cover protruding from the radial bearing radially inward, the cover opposing the top portion through an axial gap at an outer circumference side of the insertion hole, wherein
    the output shaft has an inner tapered portion which decreases in diameter as approaching the insertion hole radially inward from the top portion, and
    the cover opposes the top portion at an outer circumference side of the inner tapered portion.

2. The step motor according to claim 1, wherein the top portion has a width in a radial direction.

3. The step motor according to claim 1, wherein
    the output shaft has an outer tapered portion which increases in diameter as approaching a support interface of the radial bearing radially outward from the top portion, and
    the cover opposes the outer tapered portion through an axial gap at an outer circumference side of the top portion.

4. The step motor according to claim 1, further comprising:
    a thrust bearing that thrust-supports the output shaft from a side opposite to the top portion; and
    a biasing member surrounding the output shaft from the outer circumference side to urge the output shaft to the side opposite to the top portion.

5. The step motor according to claim 1, wherein the cover is formed integrally with the radial bearing.

6. The step motor according to claim 1, wherein the cover is formed separately from the radial bearing and is mounted on the radial bearing.

7. An indicator instrument for a vehicle comprising:
    the step motor according to claim 1; and
    a rotary indicator that indicates a state value of the vehicle as the rotary body.

* * * * *